April 21, 1959

W. G. GROVE 2,882,950

VEHICLE TIRE

Filed March 1, 1956

INVENTOR
W. G. Grove

BY Mason, Fenwick & Lawrence
ATTORNEYS

April 21, 1959

W. G. GROVE 2,882,950

VEHICLE TIRE

Filed March 1, 1956

INVENTOR
W. G. Grove
BY
Mason, Fenwick & Lawrence
ATTORNEYS

United States Patent Office 2,882,950
Patented Apr. 21, 1959

2,882,950

VEHICLE TIRE

William G. Grove, Bluefield, W. Va.

Application March 1, 1956, Serial No. 568,828

8 Claims. (Cl. 152—302)

This invention relates to vehicle tires, and particularly to solid tires such as are used on mine cars, for example.

Solid tires have been used extensively on mine cars and on heavy equipment around mines, construction jobs, in lumber camps, etc. Considerable difficulty has been encountered, particularly with breakage around the edge of the rim. Nevertheless, solid tires have advantages in such uses not present in pneumatic tires. Pneumatic tires, on the other hand, have advantages not found in solid tires, but their use is not feasible, particularly in the narrow confines of a mine where maintenance and repair cannot be done. On most jobs of this type, the contractor, or whoever is doing the job, does not have time for the maintenance. In addition, they do not have the equipment necessary for service and maintenance, as portable vulcanizers are usually the only equipment available and they will not operate on solid tires. Due to lack of proper care, three months is the general life of a pneumatic tire.

The primary object of the present invention is to provide a tire which will last for long periods of time without service and maintenance.

A further object of the present invention is to provide a solid tire which incorporates some of the structural features of the pneumatic tire.

Another object is the provision of such a tire wherein the rubber is reinforced both transversely and circumferentially for added strength.

Yet another object is to provide a solid tire having plies of fabric arranged throughout the rubber.

Still another object is the provision of a solid tire having a protective facing to prevent breaks at the rim and serve as a seal between the several plies of the tire.

Other objects of the invention will become apparent from the following description of two practical embodiments thereof, when taken in conjunction with the drawings which accompany, and form part of, this specification.

Figure 1:
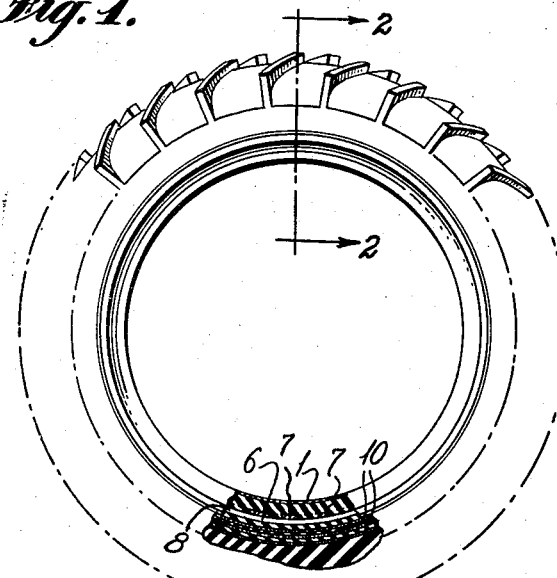
Figure 1 is a side elevation of a tire and rim constructed in accordance with the principles of the present invention.
Figure 2:
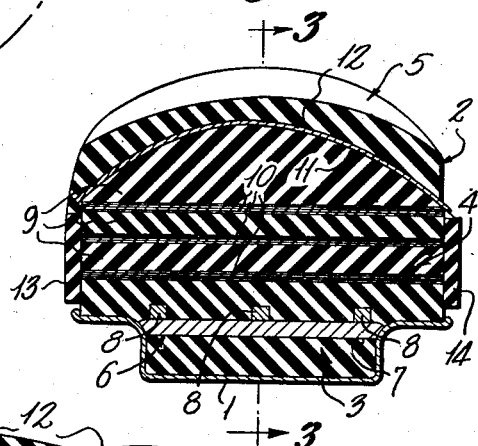
Figure 2 is a transverse section through the tire and rim, and is taken on the line 2—2 of Figure 1.
Figure 3:
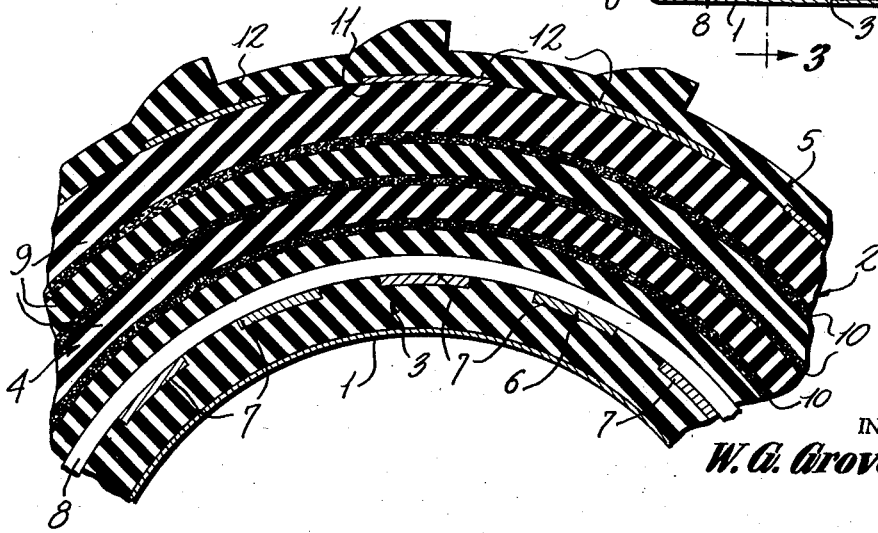
Figure 3 is a central section through a portion of the tire and rim, and is taken on the line 3—3 of Figure 2.

Referring to the drawings in detail, and first adverting to the form shown in Figures 1 to 3, there is shown a conventional rim 1 of the type on which a solid tire is usually mounted. The tire 2 is composed of a lower section 3, a central section 4 where plies of rubber and fabric alternate, and an upper, tread section 5.

The standard type rim is modified somewhat to receive the present tire. An auxiliary framework 6 is set into the rim to serve as a tie-member to strengthen the tire and lock it to the rim. This consists of a plurality of cross-members 7 which extend transversely of the rim and are spaced apart around the periphery of the rim. The cross-members 7 have their ends curved in a vertical direction to fit snugly on the curve at the juncture of the rim flange and side wall of the center well. The cross-members, in turn, are joined by several annular bands 8, which are welded or otherwise secured to the cross-members.

The lower section 3 of the tire is of rubber, and is molded in place so as to interlock with, and become keyed to, the framework 6. The top of this section, as will be seen from Figure 2, is just slightly above the tops of bands 8. The cross-members and bands may be sandblasted to roughen them so that the rubber will adhere to them.

The central section of the tire is made up of a plurality of alternating plies of rubber 9 and of nylon or rayon cord 10. As many plies of cord may be used in each cord ply as is desired. The top ply of rubber is arched, as at 11.

A second framework structure is interposed between the central and upper sections of the tire. This consists of a plurality of transverse members 12 which are longitudinally arched to lie across the rounded top of the central tire section. These members are joined at their ends to the outer peripheries of annular side bands 13 and 14. These bands extend around the tire just above the rim and serve to stiffen the tire, prevent the rubber of the tire from being struck by outside objects, and seal the sides of the tire to keep the side edges of the cord plies from being exposed.

The upper, or cap portion, of the tire may have any desired contour, and carry any tread design. This section will be vulcanized to the central section through the spaces intermediate the transverse frame members 12.

It will be seen that by use of rubber and nylon or rayon cord plies, the tire is given many of the riding and wearing qualities of the pneumatic tire. The use of the metal framework and the side bands gives added strength and protection to the tire. By interconnecting the side bands through the tire itself, the stresses and strains will be somewhat equalized and cracking and breakage minimized.

Figure 4:
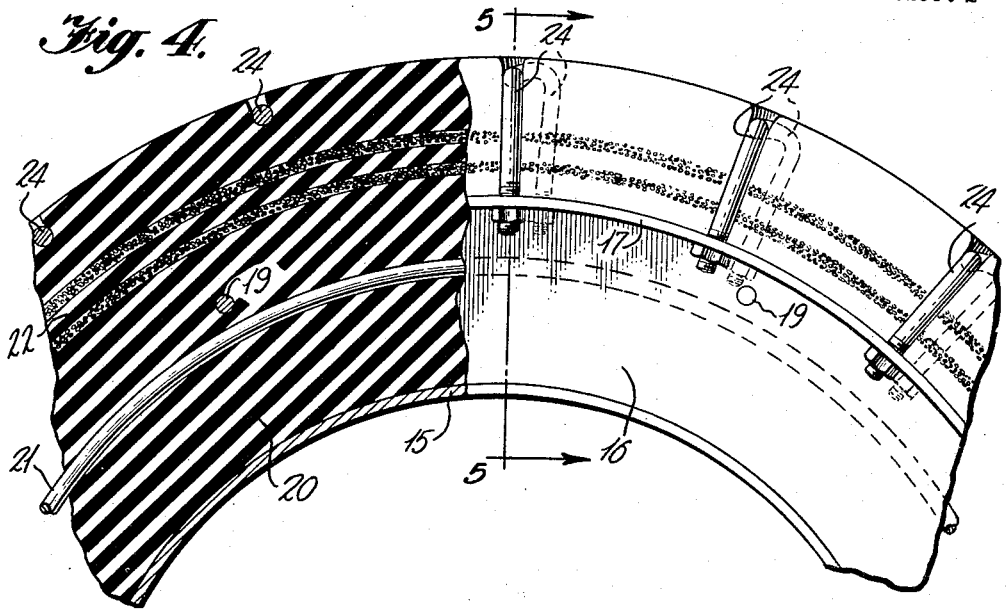
Figure 4 is a fragmentary side view of a tire of slightly modified construction, parts being shown in sections.
Figure 5:
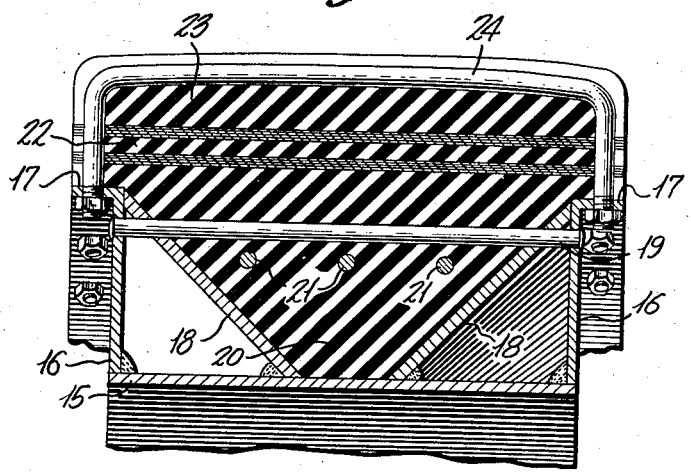
Figure 5 is a vertical section taken on the line 5—5 of Figure 4.

In Figures 4 and 5 there is shown a slightly modified rim and tire construction. Here, the rim 15 has much higher side flanges 16 than in the first form described. Horizontal side flanges 17 are provided at the tops of the sides as before. Annular inclined plates 18 are arranged within the rim and, as shown, extend from the juncture of the vertical and horizontal rim flanges 16 and 17 angularly downward to the bottom of the rim. The annular edges of the rim are welded to the side flanges and bottom of the rim. Although the plates 18 are shown as separated at the bottom, they may be arranged at a different angle so that they will meet at the rim bottom.

The upper side flanges are bridged by a plurality of transversely positioned rods or bars 19, which serve to brace the side walls and to lock the lower rubber section 20 of the tire to the rim. The rubber is molded in the rim, filling the space between the inclined plates 18. Annular bands 21, either flat or round as shown, are imbedded in this rubber layer.

On top of the rubber section 20, there is a central section 22 composed of alternate layers of rubber and fabric, as described in the previous form. Around the central section, there is a top or cap portion 23 of rubber.

Inset into the top of the tire are a plurality of U-shaped bridge members 24 which act as brace members and also tend to keep the several scetions of the tire from separating. The ends of the legs of the U-members are inserted through openings in the horizontal rim flanges 17 and riveted. It will be obvious that they may be welded to these flanges if desired.

The principal advantage of this form of the invention is its lightness in weight. The angularly positioned plates 18 give great rigidity to the rim and form annular pockets 25 in which there is no rubber. This results in a saving of material and a reduction in weight without sacrificing strength.

While in the above one practical embodiment of the invention has been disclosed, it will be understood that the details of construction described and shown are merely by way of illustration, and the invention may take other forms within the scope of the appended claims.

What is claimed is:

1. In a vehicle tire, an annular rim having spaced sides and a bottom, a framework including a plurality of transversely extending circumferentially spaced cross-members and a plurality of transversely spaced annular bands in said rim above the bottom thereof, a lower tire section of rubber in said rim and keyed to said framework and extending above said framework, a central tire section upon said lower tire section of alternate superposed plies of rubber and fabric, and an upper tread section of rubber upon said central section.

2. In a vehicle tire as claimed in claim 1, circumferentially spaced members extending transversely of said tire intermediate said central and upper tire sections, and annular side bands to which the ends of the members intermediate said central and upper tire sections are connected.

3. In a vehicle tire as claimed in claim 2, said fabric being nylon cord.

4. In a vehicle tire as claimed in claim 1, circumferentially spaced members extending in an arcuate path transversely of said tire intermediate said central and upper tire sections, and annular side bands to which the ends of the members intermediate said central and upper tire sections are connected, said side bands extending vertically across the side faces of said central tire section to cover the side faces of said central section.

5. In a vehicle tire as claimed in claim 4, said fabric being rayon cord.

6. In a vehicle tire, a rim having spaced sides and a bottom, a framework including a plurality of transversely extending circumferentially spaced cross-members and a plurality of transversely spaced annular bands in said rim above the bottom thereof, annular plates in said rim inclined to the sides and bottom of the rim and having their respective edges secured to the sides and bottom of said rim, a lower tire section in said rim intermediate said annular plates and keyed to said framework, a central tire section of alternate plies of rubber and fabric, and an outer tire section of rubber.

7. In a vehicle tire as claimed in claim 6, inverted U-shaped members extending transversely of said tire at spaced points therearound, imbedded in said tire and having their ends fixed to said rim.

8. In a vehicle tire, a rim, a framework including a plurality of transversely extending circumferentially spaced cross-members and a plurality of transversely spaced annular bands in said rim above the bottom thereof, a lower tire section of rubber in said rim and keyed to said framework and extending above said framework, a central tire section upon said lower tire section of alternate superposed plies of rubber and fabric, a secondary framework including a plurality of circumferentially spaced bridge members extending across said tire above said central section and means embracing and extending exteriorly across the sides of said central tire section connected to the bridge members, and an upper tread section of rubber upon said central section.

References Cited in the file of this patent

UNITED STATES PATENTS

| 974,713 | Simpson | Nov. 1, 1910 |
| 997,668 | Haines | July 11, 1911 |
| 1,349,914 | Pratt | Aug. 17, 1920 |
| 2,014,811 | Mayer | Sept. 17, 1935 |

FOREIGN PATENTS

| 317,585 | France | May 18, 1902 |